United States Patent
Liang et al.

(10) Patent No.: US 10,642,924 B2
(45) Date of Patent: May 5, 2020

(54) ADVERTISEMENT FILTERING METHOD AND DEVICE

(71) Applicant: GUANGZHOU UCWEB COMPUTER TECHNOLOGY CO., LTD., Guangzhou (CN)

(72) Inventors: Jie Liang, Guangzhou (CN); Butuo Duan, Guangzhou (CN)

(73) Assignee: GUANGZHOU UCWEB COMPUTER TECHNOLOGY CO., LTD., Guangzhou (CN)

(*) Notice: Subject to any disclaimer, the term of this patent is extended or adjusted under 35 U.S.C. 154(b) by 151 days.

(21) Appl. No.: 15/527,971

(22) PCT Filed: Jul. 31, 2015

(86) PCT No.: PCT/CN2015/085803
§ 371 (c)(1),
(2) Date: May 18, 2017

(87) PCT Pub. No.: WO2016/078442
PCT Pub. Date: May 26, 2016

(65) Prior Publication Data
US 2017/0351644 A1  Dec. 7, 2017

(30) Foreign Application Priority Data
Nov. 18, 2014 (CN) .......................... 2014 1 0660037

(51) Int. Cl.
*G06F 17/27* (2006.01)
*G06F 17/21* (2006.01)
(Continued)

(52) U.S. Cl.
CPC ........ *G06F 17/212* (2013.01); *G06F 16/9535* (2019.01); *G06F 16/986* (2019.01);
(Continued)

(58) Field of Classification Search
CPC .. G06F 17/211; G06F 17/212; G06F 17/2247; G06F 16/986; G06F 16/9535; G06F 17/272; G06Q 30/0277
(Continued)

(56) References Cited

U.S. PATENT DOCUMENTS 8,176,205 B2 * 5/2012 Sze .......................... H04L 67/04
709/206
8,181,104 B1 * 5/2012 Helfand .............. G06F 17/2247
715/234

(Continued)

FOREIGN PATENT DOCUMENTS

| AU | 2014100875 | 9/2014 |
| CN | 103064849 | 4/2013 |

(Continued)

OTHER PUBLICATIONS

Jenkov, 2014, "CSS Tutorial" and particularly, "6. CSS Precedence" available at archive.org and at: tutorials.jenkov.com/css/index.html (Year: 2014).*

(Continued)

*Primary Examiner* — Maikhanh Nguyen
(74) *Attorney, Agent, or Firm* — Alston & Bird LLP (57) ABSTRACT

An advertisement filtering method and device. The method comprises: access a web page by using a browser, acquire a selector of an advertisement element according to a domain name of the web page, and add a rule statement for hiding the advertisement element after the selector to generate a CSS style of a specific category (S10); inject the CSS style of the specific category into the browser (S11); set a cascading priority of the CSS style of the specific category to a highest cascading priority (S12); and the browser performs cascading on the CSS styles according to an order of the cascading priority of the CSS style to enable the CSS style of the specific category to take effect (S13). In this way, in (Continued)

a case in which an author uses a counter advertisement filtering method, an advertisement from the author can still be effectively filtered.

11 Claims, 4 Drawing Sheets

(51) Int. Cl.
    *G06F 16/958*     (2019.01)
    *G06F 16/9535*     (2019.01)
    *G06F 17/22*     (2006.01)
    *G06Q 30/02*     (2012.01)

(52) U.S. Cl.
    CPC ........ *G06F 17/2247* (2013.01); *G06F 17/272* (2013.01); *G06Q 30/0277* (2013.01)

(58) Field of Classification Search
    USPC ........................................................ 715/235
    See application file for complete search history.

(56) References Cited

U.S. PATENT DOCUMENTS

| | | | |
|---|---|---|---|
| 9,767,083 | B2* | 9/2017 | Fei ...................... G06F 17/2247 |
| 2002/0010757 | A1 | 1/2002 | Granik et al. |
| 2007/0240041 | A1* | 10/2007 | Pearson .............. G06F 17/2211 |
| | | | 715/209 |
| 2007/0245231 | A1* | 10/2007 | Kibler ................. G06F 17/2205 |
| | | | 715/234 |
| 2009/0300483 | A1* | 12/2009 | Viet .................... G06F 17/2247 |
| | | | 715/236 |
| 2010/0180194 | A1* | 7/2010 | Ji ............................. G06F 8/38 |
| | | | 715/234 |
| 2012/0005429 | A1* | 1/2012 | Kalasapur ............. G06F 16/957 |
| | | | 711/118 |
| 2012/0066585 | A1* | 3/2012 | Caceres ................ G06F 17/218 |
| | | | 715/235 |
| 2012/0173967 | A1* | 7/2012 | Lillesveen ............ G06F 17/227 |
| | | | 715/235 |
| 2013/0067322 | A1* | 3/2013 | Gould ..................... G06F 17/00 |
| | | | 715/235 |
| 2013/0159839 | A1* | 6/2013 | Joffray ................ G06F 17/2252 |
| | | | 715/235 |
| 2013/0174021 | A1* | 7/2013 | Buchwald ............. G06F 17/227 |
| | | | 715/235 |
| 2015/0007023 | A1* | 1/2015 | Fei ...................... G06F 17/2247 |
| | | | 715/236 |
| 2015/0234798 | A1* | 8/2015 | Mocanu .............. G06F 17/2247 |
| | | | 715/236 |
| 2016/0188552 | A1* | 6/2016 | Wang .................... G06F 17/218 |
| | | | 715/236 |
| 2017/0358012 | A1* | 12/2017 | Vallelunga ......... G06Q 30/0276 |
| 2018/0067908 | A1* | 3/2018 | Cardno ................ G06F 17/218 |

FOREIGN PATENT DOCUMENTS

| | | |
|---|---|---|
| CN | 103927355 | 7/2014 |
| CN | 104021172 | 9/2014 |

OTHER PUBLICATIONS

International Search Report and Written Opinion of the International Search Authority for International Patent Application No. PCT/CN2015/085803 dated Oct. 29, 2015, with English translation, 15 pages.

* cited by examiner

ADVERTISEMENT FILTERING METHOD AND DEVICE

CROSS-REFERENCE TO RELATED APPLICATION

The present invention claims priority to and the benefit of PCT/CN2015/085803, filed Jul. 31, 2015, which claims priority and the benefit of the Chinese Patent Application No. 201410660037.7, filed with the State Intellectual Property Office (SIPO) of the People's Republic of China on Nov. 18, 2014, the entire contents of which are incorporated by reference to the present application.

TECHNICAL FIELD

The present invention relates to the field of webpage technologies, and in particular, to an advertisement filtering method and device.

BACKGROUND ART

Along with the development of the network era, many advertisements are released and promoted on the Internet. Various advertisements can be seen on almost every webpage. Even when a user turns off an advertisement, said advertisement would reappear on the webpage after a period of time.

At present, all browsers have the function to filter advertisements. The common filtering means is to filter advertisements by using the Cascading Style Sheets (CSS) hiding method. Its principle is that a browser hides an advertisement element by forcing the display attribute of the advertisement element to be none. It is the simplest and most effective way of advertisement filtration through CSS.

With respect to the way of advertisement filtration through advertisement hiding by CSS, however, an author may take some countermeasures on the filtered advertisements to prevent the advertisements from being filtered. For example, a timer may be activated to inspect regularly whether the display attribute of an advertisement element is none and detect whether said advertisement is hidden. When the display attribute is none, the display attribute of the advertisement element is reset to: blocking said advertisement display, such that the hidden advertisement is displayed again. In view of the situation above, therefore, the existing way of hiding advertisements through CSS to achieve advertisement filtration cannot effectively block advertisements.

SUMMARY OF THE INVENTION

The main technical problem to be solved by the present invention is to provide an advertisement filtering method and device, which can still effectively filter advertisements on a page when an author takes countermeasures against the advertisement filtering method.

To solve the technical problem above, one technical solution employed by the present invention is: providing an advertisement filtering method, said method comprising: accessing a webpage by using a browser, acquiring a selector of an advertisement element of the webpage according to a domain name of the webpage, and adding a rule statement for hiding the advertisement element after the selector to generate a CSS style of a specific category; injecting the CSS style of the specific category into the browser; setting a cascading priority of the CSS style of the specific category to a highest cascading priority; and cascading, by the browser, on the CSS styles according to an order of cascading priorities of the CSS styles to enable the CSS style of the specific category to take effect.

Wherein the step of cascading, by the browser, on the CSS styles according to an order of cascading priorities of the CSS styles to enable the CSS style of the specific category to take effect comprises: acquiring a CSS style of a webpage having the same selector as the CSS style of the specific category; and sequentially selecting, according to an ascending order of cascading priorities of the acquired CSS style and the CSS style of the specific category, one CSS style and assigning the attribute value of its rule statement to the attribute of the rule statement of the advertisement element.

Wherein the advertisement filtering method further comprises: parsing the CSS style of the specific category to obtain the corresponding selector and rule statement, and storing the parsing results into a CSS style table to update said CSS style table; wherein, said CSS style table further stores selectors and rule statements of CSS styles of said webpage; determining, according to the change of said CSS style table, that the current style of the browser changes; and performing calculation on the webpage CSS styles and the CSS style of the specific category.

Wherein, the performing calculation on the webpage CSS styles and the CSS style of the specific category is specifically: classifying rule statements according to selectors of CSS styles in said updated CSS style table, and placing rule statements of the same selectors in the same classification.

Wherein, the advertisement filtering method further comprises: acquiring, according to the classification result from classifying rule statements, a CSS rule statement corresponding to the selector of said advertisement element, so as to determine a corresponding CSS style.

Wherein, the step of injecting the CSS style of the specific category into the browser is specifically: injecting the CSS style of the specific category into the browser via a newly added interface.

To solve the technical problem above, another technical solution employed by the present invention is: providing an advertisement filtering device, said device comprising: a CSS style generation module configured to access a webpage by using a browser, acquire a selector of an advertisement element of the webpage according to a domain name of the webpage, and add a rule statement for hiding the advertisement element after the selector to generate a CSS style of a specific category; a CSS style injection module configured to inject the CSS style of the specific category generated by the CSS style generation module into the browser; a cascading priority setting module configured to set a cascading priority of the CSS style of the specific category generated by the CSS style generation module to a highest cascading priority; and a CSS style enabling module configured to cascade on the CSS styles according to an order of cascading priorities of the CSS styles to enable the CSS style of the specific category to take effect.

Wherein, the CSS style enabling module enabling the CSS style of the specific category to take effect is specifically: acquiring a CSS style of a webpage having the same selector as the CSS style of the specific category, and sequentially selecting, according to an ascending order of cascading priorities of the acquired CSS style and the CSS style of the specific category, one CSS style and assigning the value of its rule statement to the rule statement of the advertisement element.

Wherein, the device further comprises: a CSS style parsing module configured to parse the CSS style of the specific category generated by the CSS style generation module to obtain the corresponding selector and rule statement, and store the parsing results into a CSS style table to update said CSS style table; wherein, said CSS style table further stores selectors and rule statements of CSS styles of said webpage; a CSS style calculation module configured to determine, according to the change of said CSS style table, that the current style of the browser changes, and perform calculation on the webpage CSS styles and the CSS style of the specific category.

Wherein, the device further comprises: a CSS style matching module configured to acquire, according to the result obtained by the CSS style calculation module, a CSS rule statement corresponding to the selector of said advertisement element, so as to determine a corresponding CSS style.

The present invention has the following advantageous effects: when accessing a webpage by using a browser, the present invention injects a CSS style of a specific category with a high cascading priority, said CSS style of the specific category comprising a selector that is the same as the selector of an advertisement element, adds a rule statement for hiding the advertisement element after the selector, assigns a value to the advertisement element according to an ascending order of style cascading priorities, so as to use said CSS style of the specific category to control the display attribute of the advertisement element, such that the advertisement element is not displayed during the webpage rendering. Since the CSS style from ADB is set to have the highest priority, and since the CSS style with the highest priority is assigned with a value at the last when a value is assigned to the display attribute of the advertisement element, any attribute of the CSS style provided by an author will be overwritten by the attribute of the CSS style from ADB, such that the display attribute of the advertisement element is ultimately adjusted to the attribute of the CSS style from ADB, namely the advertisement element is hidden. In such a way, advertisements from authors can be effectively filtered. As a result, the technical deficiency in advertisement filtration by means of hiding is addressed, and there is no need to change the filtration rules of existing advertisement filtration.

COMPONENT LEGENDS

Device 40, 50
CSS style generation module 41, 51
CSS style injection module 42, 52
Cascading priority setting module 43, 53
CSS style enabling module 44, 54
CSS style parsing module 55
CSS style calculation module 56
CSS style matching module 57

DETAILED DESCRIPTION OF THE SPECIFIC EMBODIMENTS

The present invention will be described in detail below with reference to the accompanying drawings and embodiments.

First, the following concepts used in the present invention will be explained.

Cascading Style Sheets (CSS) is a computer language used to express styles of files, such as Hyper Text Markup Language (HTML) or Extensible Markup Language (XML). As a style design language that can truly separate webpage expression from contents, it can perform pixel-level accurate control on positions and typesetting of objects in a webpage, support almost all fonts, font sizes, and styles, has the capability to edit webpage objects and model styles, and can perform preliminary interactive design. A CSS style typically consists of two parts: a selector to express the type of a style, CSS selector types including ID selector, category selector, general selector, tag selector, and the like; a rule statement consisting of attributes and attribute values of CSS elements, wherein the property is style attribute, each attribute has an attribute value, and attributes and attribute values represent the final expression format of the CSS elements.

Webpage element is a foundation of the file structure. In CSS, each webpage element generates a frame comprising webpage element contents, and different webpage elements have different display modes. Webpage elements comprise advertisement element, and the advertisement element refers to an element related to advertisement display.

CSS style source refers to the source from which a CSS style comes. For example, the CSS style source may be from an author, a user, a user agent, and the like. For different CSS style sources, there are different style cascading modes. All CSS styles with an Author source are compiled and released by website administrators; a user, i.e. a user who browses a webpage, may revise the style of a webpage element using some means; a user agent typically refers to a browser. Some browsers may revise the style of a webpage element by setting options. In countermeasures according to the prior art that are against CSS methods for hiding and blocking advertisements, the mode to increase the priority of the display attribute of an advertisement element by stating important keyword, and the mode to change the display attribute of an advertisement element by activating polling through a timer are both CSS styles with an Author source.

Figure 1:
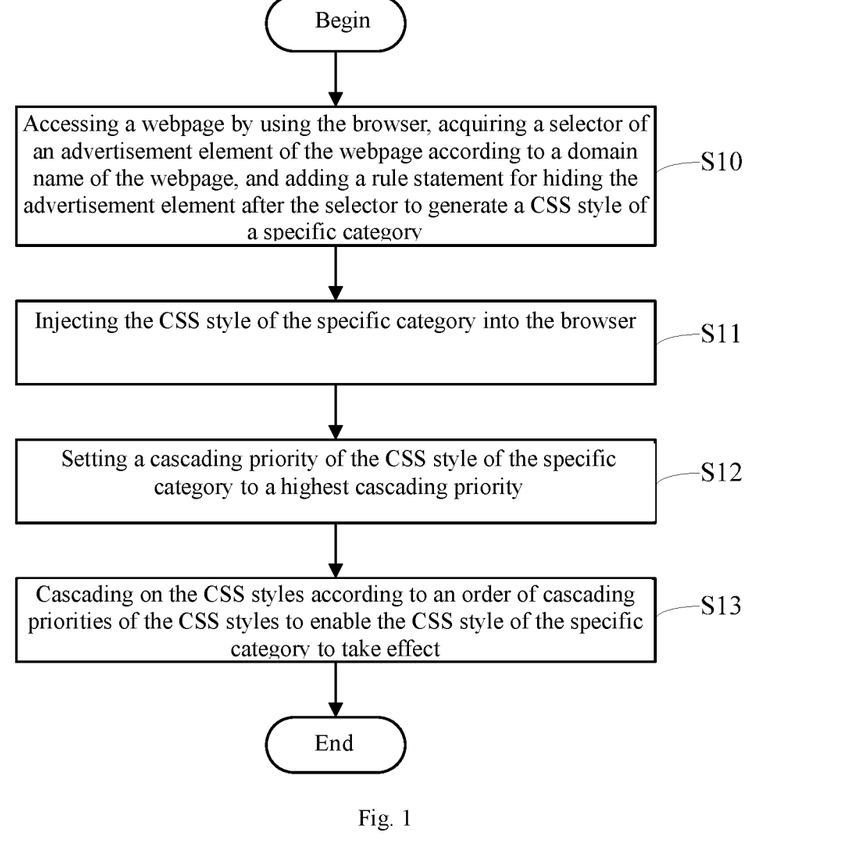
FIG. 1 is a flowchart of an embodiment of the advertisement filtering method according to the present invention.

Please refer to FIG. 1, which is a flowchart of an embodiment of the advertisement filtering method according to the present invention. The flowchart of the present embodiment shows the situation in which a browser has opened a web page, said method comprising:

Step S10: accessing a webpage by using the browser, acquiring a selector of an advertisement element of the webpage according to a domain name of the webpage, and adding a rule statement for hiding the advertisement element after the selector to generate a CSS style of a specific category.

Step S11: injecting the CSS style of the specific category into the browser.

Step S12: setting a cascading priority of the CSS style of the specific category to a highest cascading priority.

Step S13: cascading, by the browser, on the CSS styles according to an order of cascading priorities of the CSS styles to enable the CSS style of the specific category to take effect.

With the embodiment of the present invention, when accessing a webpage by using a browser, the present invention injects a CSS style of a specific category with the highest cascading priority, said CSS style of the specific category comprising a selector that is the same as the selector of an advertisement element, adds a rule statement for hiding the advertisement element after the selector, assigns a value to the advertisement element according to an ascending order of style cascading priorities, so as to use said CSS style of the specific category to control the display attribute of the advertisement element, such that the advertisement element is not displayed during the webpage rendering. As a result, the technical deficiency in advertisement filtration by means of hiding is addressed, and there is no need to change the filtration rules of existing advertisement filtration.

Figure 2:
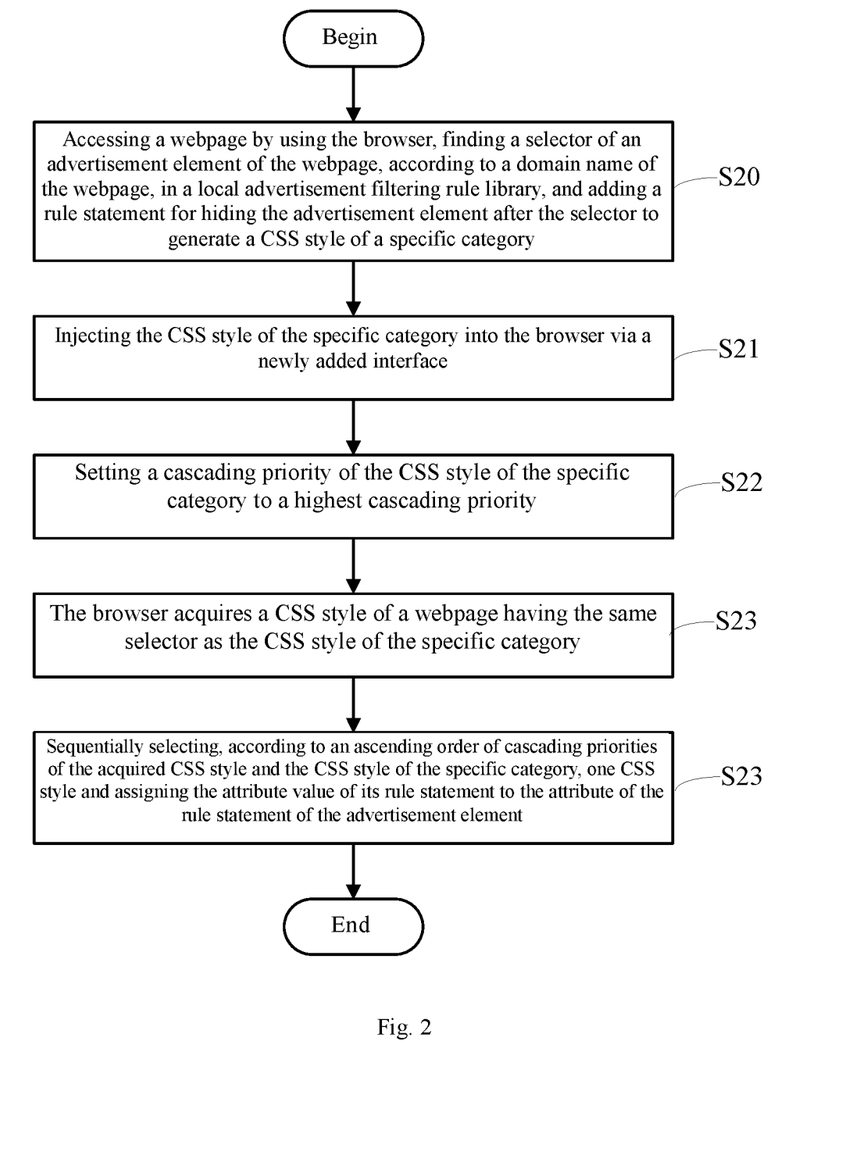
FIG. 2 is a flowchart of another embodiment of the advertisement filtering method according to the present invention.

Please refer to FIG. 2, which is a flowchart of another embodiment of the advertisement filtering method according to the present invention. The flowchart of the present embodiment shows the situation in which a browser has opened a web page, said method comprising:

Step S20: accessing a webpage by using the browser, finding a selector of an advertisement element of the webpage, according to a domain name of the webpage, in a local advertisement filtering rule library, and adding a rule statement for hiding the advertisement element after the selector to generate a CSS style of a specific category.

Specifically, the rule statement for hiding the advertisement element is: setting the display attribute of the CSS style of the advertisement element to none, or to none !important.

For example, assuming that a webpage http://m.autohome.com.cn/ has one advertisement element, and the CSS style of the advertisement element is recorded in a local advertisement filtering rule library. The CSS-type selector comprised in the CSS style of the advertisement element is ".fn_a14_", and the following CSS style rule is stated: .fn_a14_{display: block !important;}. When this webpage is opened in a browser, therefore, the CSS style of the advertisement element can be acquired from the advertisement filtering rule library according to the domain name m.autohome.com.cn. The establishment of the local advertisement filtering rule library in the embodiment of the present invention is the same as that according to the prior art, which will not be repeated herein.

Step S21: injecting the CSS style of the specific category into the browser via a newly added interface.

Specifically, injecting the CSS style of the specific category into the browser via a newly added interface Document::appendADBText(const String&string). Wherein, ADB is the CSS style of the specific category.

Step S22: setting a cascading priority of the CSS style of the specific category to a highest cascading priority.

Wherein said webpage has a plurality of CSS styles of different categories, such as Transition, User, Agent, User, Author, Animation, and the like. These CSS styles of different categories are all defined with respective cascading priorities.

Step S23: the browser acquires a CSS style of a webpage having the same selector as the CSS style of the specific category.

Step S24: sequentially selecting, according to an ascending order of cascading priorities of the acquired CSS style and the CSS style of the specific category, one CSS style and assigning the attribute value of its rule statement to the attribute of the rule statement of the advertisement element.

As described above, the CSS styles are cascaded according to an order of cascading priorities of the CSS styles to enable the CSS style of the specific category to take effect, so as to control the display attribute of the advertisement element by setting a cascading priority of the CSS style of the specific category to a highest cascading priority, such that the advertisement element is not displayed during the webpage rendering.

When style cascading is used to assign a value to the advertisement element, the acquired CSS style and the CSS style of the specific category form a CSS style set, and all CSS styles in said CSS style set are defined with respective cascading priorities. According to an ascending order of cascading priorities, the browser selects one CSS style from the above CSS style set each time to assign a value to the advertisement element, until the CSS style with the highest cascading priority (the CSS style of the specific category) is selected, and at this moment, the final value assigned to the advertisement element is the CSS style with the highest cascading priority.

The cascading priority of the CSS style of the specific category is set to be the highest among all CSS styles. In such a way, it can ensure that, when a value is assigned to the advertisement element in an ascending order of cascading styles, the CSS style of the specific category is used at the last to control the display attribute of the advertisement element, and then control the advertisement element not to be displayed.

In the process of CSS style cascading, the CSS style with the highest priority is cascaded at last. In the case of the same priority, the style that is last written into the CSS style table is a style that is presented ultimately.

Since a webpage has a plurality of CSS styles of different categories, a browser further performs the above-described style cascading on CSS styles of each category, such that a value is assigned to the corresponding element, which will not be repeated herein.

Figure 3:
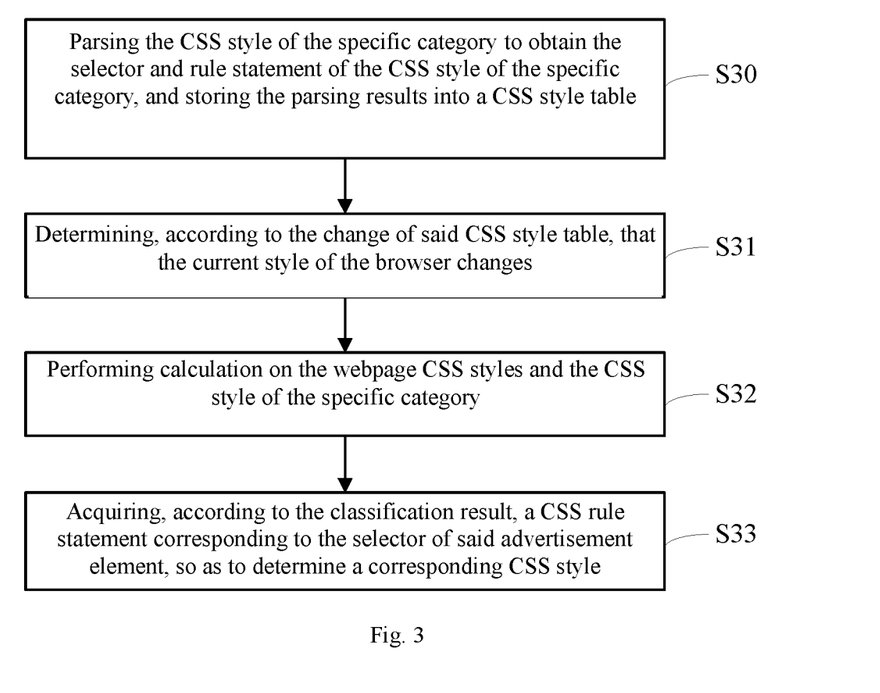
FIG. 3 is a flowchart of an embodiment of the method for enabling the CSS style of the specific category in the advertisement filtering method according to the present invention.

Please refer to FIG. 3 simultaneously, which is a flowchart of an embodiment of the method for enabling the CSS style of the specific category in the advertisement filtering method according to the present invention, said method comprising:

Step S30: parsing the CSS style of the specific category to obtain the selector and rule statement of the CSS style of the specific category, and storing the parsing results into a CSS style table.

Wherein said CSS style table further stores selectors and rule statements corresponding to various CSS styles of said webpage.

Specifically, after receiving the injected CSS style of the specific category via the newly added interface, the browser parses the CSS style of the specific category to obtain corresponding selector and rule statement, and at the same time, generates a corresponding Hash value, and stores the parsing results (including the selector and rule statement) into a CSS style table object. Through said CSS style table object, the rule statement of the CSS style of the specific category is added into said CSS style table, such that the parsing results are stored into the CSS style table.

Step S31: determining, according to the change of said CSS style table, that the current style of the browser changes.

Specifically, when the browser is injected with a new CSS style, a CSS style changes, or an original CSS style is deleted, the size or array items of the CSS style table will be changed. Therefore, the CSS style table becomes larger when the CSS style of the specific category is injected into the browser in the embodiment of the present invention.

Furthermore, the style table is analyzed through the interface Document::analyzeStylesheetChange( ), and the function styleSelectorChanged( ) is called to determine, according to the analysis result, whether the style table has changed.

Step S32: performing calculation on the webpage CSS styles and the CSS style of the specific category.

Specifically, rule statements are classified according to selectors of CSS styles in said updated CSS style table, and rule statements of the same selectors are placed in the same classification. In other words, rule statements of CSS styles having the same selectors are placed in the same classification.

Since said CSS style table stores selectors and rule statements corresponding to various CSS styles of said webpage, and moreover, the selector and rule statement of the CSS style of the specific category are added, the same selectors in the current CSS style table are placed in the same classification, and rule statements having the same selector classification are also placed in the same classification. The advantage of such a practice is that it facilitates the subsequent style matching and style cascading (to be described in detail below).

Specifically, selectors and rule statements of the CSS styles stored in the CSS style table are classified accordingly by querying the CSS style table object, such that the CSS style table object is converted to a RuleSet object. In the present embodiment, selectors that are the same as the selector of the CSS style of the specific category are determined, and rule statements corresponding to these selectors are all placed in the same classification. The classification results are stored in m_ADBStyle, and m_ADBStyle is a RuleSet object.

Furthermore, when the CSS of the specific category is generated as set forth in the step S20, the CSS styles of the specific category with different sources may be generated corresponding to different operation objects (e.g. Author, User, User Agent and the like), and the CSS styles of the specific category with different sources are different as well. Said CSS styles of the specific category with different sources are parsed, respectively, as set forth in the step S30, and all the parsing results are stored in the CSS style table. Therefore, when rule statements are classified according to the selectors of the CSS styles in the CSS style table by querying the CSS style table object, corresponding classification results are stored in one RuleSet, such that one RuleSet only stores the classification results of CSS styles from the same source.

In the present embodiment, the style cascading priorities of all current CSS styles after calculation are listed from high to low as follows:

(1) Important ADB style
(2) Transition style
(3) Important User Agent style
(4) Important User style
(5) Important file object model style
(6) Important Author style
(7) ADB style
(8) Animation style
(9) File object model style
(10) Author style
(11) User style
(12) User Agent style Wherein the ADB style is the CSS style of the specific category.

Sub-step S33: acquiring, according to the classification result, a CSS rule statement corresponding to the selector of said advertisement element, so as to determine a corresponding CSS style.

When the browser constructs a webpage rendering style for each element, it initiates a style matching flow via the interface CSSStyleSelector::StyleForElement( ). The style matching flow is specifically: performing style matching for CSS styles of different categories, such as User Agent, User, Author and the like, respectively, via the interface matchRuleSet( ), acquiring all rule statements, according to the selector of each CSS style and by combining with the classification results as set forth in the step S32, to realize style matching, and storing the matching results in a specific data structure MatchResult. In the present embodiment, m_ADBStyle stores the classification results of the CSS style of the specific category. Therefore, the style matching described above is performed for m_ADBStyle via the interface matchRuleSet( ) and the matching results are stored to MatchResult.

Then, as set forth in the step S24, according to an ascending order of cascading priorities of all CSS styles, the attribute value of the rule statement of one CSS style is selected and assigned to the attribute of the rule statement of the advertisement element.

Specifically, after styles of different categories are matched, the browser will not use all matched styles to construct a final rendering style. Instead, it first determines priorities of the matched styles in MatchResult via the interface CSSStyleSelector::applyMatchedDeclarations( ), and performs value matching on rule statements of the corresponding elements according to an ascending order of style cascading priorities. Therefore, only styles with high cascading priorities will ultimately appear in RenderStyle.

Since the CSS style with the highest priority is cascaded at last in the process of CSS style cascading, in the case of the same priority, the style that is last written into the CSS style table is a style that is presented ultimately. For example, the Important ADB style and the Important User Agent style above in the present embodiment both have "Important" as a style priority statement. Since the Important ADB style is written into the CSS style table after the Important User Agent style, however, the Important ADB style is the last to be cascaded during style cascading, and it is believed that the cascading priority of the Important ADB style is the highest.

When a value is assigned to the attribute of the rule statement of the advertisement element through the style cascading as described above, the style of the advertisement element is ultimately set to the CSS style of the specific category, i.e. the Important ADB style. Since the rule statement of the CSS style of the specific category is to hide the advertisement element, the advertisement element is not displayed during webpage style rendering.

Similarly with the webpage http://m.autohome.com.cn/ as an example, the CSS style of the specific category A: .fn_a14_{display:none !important;} for hiding advertisements is injected via the interface Document::appendADBText( ), as described above. When the injected CSS style of the specific category A: .fn_a14_{display:none !important;} exists together with a CSS style from an Author B: .fn_a14_{display:block !important;}, only the Style A will appear in the rendering styles in a style cascading process, as the cascading priority of the Style A is higher than the cascading priority of the Style B. Namely, for the CSS element .fn_a14, its final display attribute is none.

Figure 4:
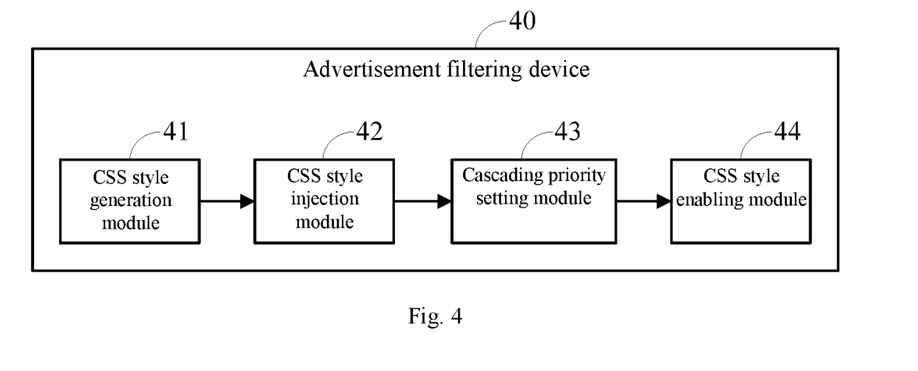
FIG. 4 is a schematic diagram of the structure of an embodiment of the advertisement filtering device according to the present invention.

Please refer to FIG. 4, which is a schematic diagram of the structure of an embodiment of the advertisement filtering device according to the present invention. In the case where a browser has opened a web page in the present embodiment, said device 40 comprises: a CSS style generation module 41, a CSS style injection module 42, a cascading priority setting module 43, and a CSS style enabling module 44.

Said CSS style generation module 41 is configured to access a webpage by using a browser, acquire a selector of an advertisement element of the webpage according to a domain name of the webpage, and add a rule statement for hiding the advertisement element after the selector to generate a CSS style of a specific category.

Said CSS style injection module 42 is configured to inject the CSS style of the specific category generated by the CSS style generation module 41 into the browser.

Said cascading priority setting module 43 is configured to set a cascading priority of the CSS style of the specific category generated by the CSS style generation module 41 to a highest cascading priority.

Said CSS style enabling module 44 is configured to cascade on the CSS styles according to an order of cascading priorities of the CSS styles to enable the CSS style of the specific category to take effect.

With the embodiment of the present invention, when accessing a webpage by using a browser, the present invention injects a CSS style of a specific category with the highest cascading priority, said CSS style of the specific category comprising a selector that is the same as the selector of an advertisement element, adds a rule statement for hiding the advertisement element after the selector, assigns a value to the advertisement element according to an ascending order of style cascading priorities, so as to use said CSS style of the specific category to control the display attribute of the advertisement element, such that the advertisement element is not displayed during the webpage rendering. As a result, the technical deficiency in advertisement filtration by means of hiding is addressed, and there is no need to change the filtration rules of existing advertisement filtration.

Figure 5:
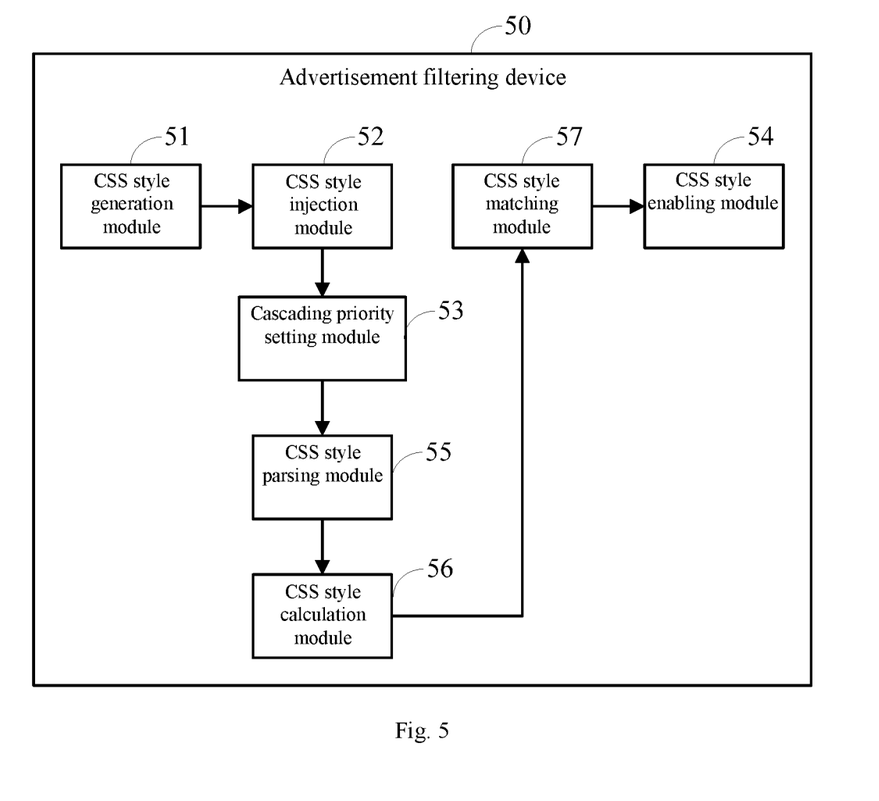
FIG. 5 is a schematic diagram of the structure of another embodiment of the advertisement filtering device according to the present invention.

Please refer to FIG. 5, which is a schematic diagram of the structure of another embodiment of the advertisement filtering device according to the present invention. In the case where a browser has opened a web page in the present embodiment, said device comprises: a CSS style injection module 52, a cascading priority setting module 53, a CSS style enabling module 54, a CSS style parsing module 55, a CSS style calculation module 56, and a CSS style matching module 57.

Said CSS style generation module 51 is configured to access a webpage by using a browser, acquire a selector of an advertisement element of the webpage according to a domain name of the webpage, and add a rule statement for hiding the advertisement element after the selector to generate a CSS style of a specific category.

In the present embodiment, said CSS style generation module 51 finds a selector of an advertisement element of the webpage, according to a domain name of the webpage, in a local advertisement filtering rule library. Specifically, said CSS style generation module 51 sets the rule statement for hiding the advertisement element to be: setting the display attribute of the CSS style of the advertisement element to none, or to none !important.

For example, assuming that a webpage http://m.autohome.com.cn/ has one advertisement element, and the CSS style of the advertisement element is recorded in a local advertisement filtering rule library. The CSS-type selector comprised in the CSS style of the advertisement element is ".fn_a14_", and the following CSS style rule is stated: .fn_a14_{display: block !important;}. When this webpage is opened in a browser, therefore, the CSS style of the advertisement element can be acquired from the advertisement filtering rule library according to the domain name m.autohome.com.cn.

Said CSS style injection module 52 is configured to inject the CSS style of the specific category generated by the CSS style generation module 51 into the browser. Specifically, said CSS style injection module 52 injects the CSS style of the specific category into the browser via a newly added interface. Furthermore, the CSS style of the specific category is injected into the browser via a newly added interface Document::appendADBText(const String&string). Wherein ADB is the CSS style of the specific category.

Said CSS style parsing module 55 is configured to parse the CSS style of the specific category generated by the CSS style generation module 51 to obtain the selector and rule statement of the CSS style of the specific category, and store the parsing results into a CSS style table to update said CSS style table. Wherein, said CSS style table further stores selectors and rule statements corresponding to various CSS styles of said webpage. Specifically, after said CSS style injection module 52 receives the injected CSS style of the specific category via the newly added interface, said CSS style parsing module 55 parses the CSS style of the specific category to obtain corresponding selector and rule statement, and at the same time, generates a corresponding Hash value, and stores the parsing results (including the selector and rule statement) into a CSS style table object. Through said CSS style table object, the rule statement of the CSS style of the specific category is added into said CSS style table, such that the parsing results are stored into the CSS style table.

Said CSS style calculation module 56 is configured to determine, according to the change of said CSS style table, that the current style of the browser changes, and perform calculation on the webpage CSS styles and the CSS style of the specific category. Specifically, when said CSS style injection module 52 injects a new CSS style, a CSS style changes, or an original CSS style is deleted, the size or array items of the CSS style table will be changed. Therefore, the CSS style table becomes larger when the CSS style of the specific category is injected into the browser in the embodiment of the present invention. Furthermore, said CSS style calculation module 56 analyzes the style table through the interface DocumenLanalyzeStylesheetChange( ), and calls the function styleSelcctorChanged( ) to determine, according to the analysis result, whether the style table has changed. When it is determined that the style table has changed, the browser performs calculation on all current CSS styles (including various CSS styles of said webpage and said CSS style of the specific category) again.

In the present embodiment, said CSS style calculation module 56 performing calculation on the CSS style is specifically: classifying rule statements according to selectors of CSS styles in said updated CSS style table, and placing rule statements of the same selectors in the same classification. Since said CSS style table stores selectors and rule statements corresponding to various CSS styles of said webpage, and moreover, the selector and rule statement of the CSS style of the specific category are added, the selectors of the same category in the current CSS style table are placed in the same classification, and rule statements having the same selector classification are also placed in the same classification. The advantage of such a practice is that it facilitates the subsequent style matching and style cascading (to be described in detail below). Specifically, said CSS style calculation module 56 classifies selectors and rule statements of the CSS styles stored in the CSS style table accordingly by querying the CSS style table object, and then converts the CSS style table object to a RuleSet object. In the present embodiment, said CSS style calculation module 56 determines selectors that are of the same category as the selector of the CSS style of the specific category, places rule statements corresponding to these selectors all in the same classification, and stores the classification results in m_ADBStyle. m_ADBStyle is a RuleSet object.

Furthermore, the CSS styles of the specific category with different sources are different. Therefore, when said CSS style calculation module 56 classifies rule statements according to the selectors of the CSS styles stored in the CSS style table by querying the CSS style table object, corresponding classification results are stored in one RuleSet, such that one RuleSet only stores the classification results of CSS styles from the same source.

Said CSS style matching module 57 is configured to acquire, according to the result obtained by the CSS style calculation module 56, a CSS rule statement corresponding to the selector of said advertisement element, so as to determine a corresponding CSS style. When the browser constructs a webpage rendering style for each element, said CSS style matching module 57 initiates a style matching flow via the interface CSSStyleSelector::StyleForElement( ). The style matching flow is specifically: said CSS style matching module 57 performs style matching for CSS styles of different categories, such as User Agent, User, Author and the like, respectively, via the interface matchRuleSet( ), acquires all corresponding rule statements for the selector of each CSS style, according to the results obtained by the CSS style calculation module 56, to realize style matching, and stores the matching results in a specific data structure MatchResult. In the present embodiment, the CSS style calculation module 56 stores the classification results of the CSS style of the specific category in m_ADBStyle. Therefore, said CSS style matching module 57 performs the above-described style matching for m_adbStyle via the interface matchRuleSet( ), and stores the matching results to MatchResult Said CSS style enabling module 54 is configured to select, according to an ascending order of style cascading priorities of the CSS style acquired by said CSS style matching module 57 and the CSS style of the specific category, one CSS style for assigning a value to the advertisement element, so as to control the display attribute of the advertisement element by setting a cascading priority of the CSS style of the specific category to a highest cascading priority, such that the advertisement element is not displayed during the webpage rendering.

Specifically, after styles of different categories are matched, the browser will not use all matched styles to construct a final rendering style. Instead, the CSS style enabling module 54 first determines priorities of the matched styles in MatchResult via the interface CSSStyleSelector::applyMatchedDeclarations( ), and performs value matching on rule statements of the corresponding elements according to an ascending order of style cascading priorities. Therefore, only styles with high cascading priorities will ultimately appear in RenderStyle.

In the embodiment of the present invention, the CSS style of the specific category has the highest cascading priority. When a value is assigned to the attribute of the rule statement of the advertisement element through the style cascading as described above, the style of the advertisement element is ultimately set to the CSS style of the specific category. Since the rule statement of the CSS style of the specific category is to hide the advertisement element, the advertisement element is not displayed during webpage style rendering.

Similarly with the webpage http://m.autohome.com.cn/ as an example, said CSS style injection module 52 injects the CSS style of the specific category A: .fn_a14_{display:none !important;} for hiding advertisements via the interface Document::appendADBText( ), as described above. When the injected CSS style of the specific category A: .fn_a14_{display:none !important;} exists together with a CSS style from an Author B: .fn_a14_{display:block !important;}, only the Style A will appear in the rendering styles in a style cascading process, as the cascading priority of the Style A is higher than the cascading priority of the Style B. Namely, for the CSS element. fn_a14, its final display attribute is none.

With the webpage advertisement filtering method and device of the present invention, when accessing a webpage by using a browser, the present invention injects a CSS style of a specific category with a high cascading priority, said CSS style of the specific category comprising a selector that is the same as the selector of an advertisement element, adds a rule statement for hiding the advertisement element after the selector, assigns a value to the advertisement element according to an ascending order of style cascading priorities, so as to use said CSS style of the specific category to control the display attribute of the advertisement element, such that the advertisement element is not displayed during the webpage rendering. Since the CSS style from ADB is set to have the highest priority, advertisements from authors can be effectively filtered in such a way. As a result, the technical deficiency in advertisement filtration by means of hiding is addressed, and there is no need to change the filtration rules of existing advertisement filtration.

The present invention further provides a computer program product for implementing the advertisement filtering method, comprising a computer readable storage medium that stores program codes. When a data processing device, for example CPU, runs said program codes, the advertisement filtering method described in the method embodiment above can be implemented. See the method embodiment for specific implementation, which will not be repeated herein.

Only the embodiments of the present invention are described above, which are not intended to limit the patent scope of the present invention. Any equivalent structure or equivalent flow change made by using the description and accompanying drawings of the present invention, or direct or indirect applications in other related technical fields, shall all be encompassed by the patent scope of the present invention.

The invention claimed is:

1. An advertisement filtering method, said advertisement filtering method comprising:
   accessing a webpage by using a browser;
   acquiring a selector of an advertisement element of the webpage according to a domain name of the webpage, wherein the selector is associated with a Cascading Style Sheets (CSS) style of the advertisement element;
   generating a CSS style of a specific category by adding a rule statement for hiding the advertisement element after the selector;
   injecting the CSS style of the specific category into the browser;

acquiring a second CSS style of the webpage having a same selector as the CSS style of the specific category;
setting a cascading priority of the CSS style of the specific category to a highest cascading priority than a cascading priority of the second CSS style;
parsing the CSS style of the specific category to obtain a corresponding selector and a corresponding rule statement, and storing parsing results into a CSS style table to update said CSS style table, wherein said CSS style table further stores selectors and rule statements of CSS styles of said webpage;
determining, according to a change of said CSS style table, that a current style of the browser changes;
performing calculation on the CSS styles of said webpage and the CSS style of the specific category;
cascading, by the browser, on the CSS styles according to an order of cascading priorities of the CSS styles to enable the CSS style of the specific category to take effect, comprising:
sequentially selecting, according to an ascending order of cascading priorities of the second CSS style and the CSS style of the specific category, each CSS style to assign an attribute value of a rule statement of each CSS style to an attribute of a rule statement of the advertisement element, causing cascading the CSS style of the specific category subsequent to cascading the second CSS style.

2. The advertisement filtering method according to claim 1, wherein the performing calculation on the CSS styles of said webpage and the CSS style of the specific category further comprises:
classifying rule statements according to selectors of the CSS styles in said updated CSS style table; and
placing rule statements of same selectors in a same classification.

3. The advertisement filtering method according to claim 2, further comprising:
acquiring, according to a classification result from classifying rule statements, a CSS rule statement corresponding to the selector of said advertisement element, so as to determine a corresponding CSS style.

4. The advertisement filtering method according to claim 1, wherein the step of injecting the CSS style of the specific category into the browser further comprises:
injecting the CSS style of the specific category into the browser via a newly added interface.

5. The advertisement filtering method according to claim 1, further comprising:
cascading the CSS style of the specific category last.

6. The advertisement filtering method according to claim 1, further comprising:
finding the selector of the advertisement element of the webpage accessed by the browser, according to the domain name of the webpage, in a local advertisement filtering rule library.

7. A non-transitory machine readable storage medium for storing non-transitory computer-readable program code portions that, when executed by at least one processor, are configured to:
access a webpage by using a browser;
acquire a selector of an advertisement element of the webpage according to a domain name of the webpage, wherein the selector of the advertisement element is associated with a Cascading Style Sheets (CSS) style of the advertisement element;
generate a CSS style of a specific category by adding a rule statement for hiding the advertisement element after the selector;
inject the CSS style of the specific category into the browser;
acquire a second CSS style of the webpage having a same selector as the CSS style of the specific category;
set a cascading priority of the CSS style of the specific category to a highest cascading priority;
parse the CSS style of the specific category to obtain a corresponding selector and a corresponding rule statement, and store parsing results into a CSS style table to update said CSS style table, wherein said CSS style table further stores selectors and rule statements of CSS styles of said webpage;
determine, according to a change of said CSS style table, that a current style of the browser changes;
classify rule statements according to the selectors of the CSS styles in said updated CSS style table; and
cascade, by the browser, on the CSS styles according to an order of cascading priorities of the CSS styles to enable the CSS style of the specific category to take effect, comprising:
sequentially select, according to an ascending order of cascading priorities of the second CSS style and the CSS style of the specific category, each CSS style to assign an attribute value of a rule statement of each CSS style to an attribute of a rule statement of the advertisement element, causing cascading the CSS style of the specific category subsequent to cascading the CSS style of the second CSS style.

8. The non-transitory machine readable storage medium according to claim 7, characterized in that, when said non-transitory computer-readable program code portions are executed, further configured to:
cascade the CSS style of the specific category last.

9. The non-transitory machine readable storage medium according to claim 7, characterized in that, when said non-transitory computer-readable program code portions are executed, said operations further comprise: finding the selector of the advertisement element of the webpage accessed by the browser, according to the domain name of the webpage, in a local advertisement filtering rule library.

10. An apparatus for advertisement filtering, the apparatus comprising a processor and a non-transitory memory comprising non-transitory program code, the non-transitory memory and the non-transitory program code configured to, with the processor, cause the apparatus to at least:
access a webpage by using a browser;
acquire a selector of an advertisement element of the webpage according to a domain name of the webpage, wherein the selector of the advertisement element is associated with a Cascading Style Sheets (CSS) style of the advertisement element,
generate a CSS style of a specific category by adding a rule statement for hiding the advertisement element;
inject the CSS style of the specific category into the browser;
acquire a second CSS style of the webpage having a same selector as the CSS style of the specific category;
set a cascading priority of the CSS style of the specific category to a highest cascading priority than a cascading priority of the second CSS style;
parse the CSS style of the specific category to obtain a corresponding selector and a corresponding rule statement;

store parsing results into a CSS style table to update said CSS style table, wherein said CSS style table further stores selectors and rule statements of CSS styles of said webpage;

determine, according to a change of said CSS style table, that a current style of the browser changes;

perform calculation on the CSS styles of said webpage and the CSS style of the specific category; and cascade on the CSS styles according to an order of cascading priorities of the CSS styles to enable the CSS style of the specific category to take effect, comprising:

sequentially select, according to an ascending order of cascading priorities of the second CSS style and the CSS style of the specific category, each CSS style to assign an attribute value of a rule statement of each CSS style to an attribute of a rule statement of the advertisement element, causing cascading the CSS style of the specific category subsequent to cascading the CSS style of the advertisement element.

11. The apparatus according to claim 10, wherein the non-transitory memory and the non-transitory program code are configured to, with the processor, cause the apparatus to:

acquire a CSS rule statement corresponding to the selector of said advertisement element, so as to determine a corresponding CSS style.

\* \* \* \* \*